United States Patent [19]

Groeneweg

[11] 4,133,002
[45] Jan. 2, 1979

[54] PAL IDENTIFICATION CIRCUIT

[75] Inventor: Willem H. Groeneweg, Ottenbach, Switzerland

[73] Assignee: RCA Corporation, New York, N.Y.

[21] Appl. No.: 836,420

[22] Filed: Sep. 26, 1977

[51] Int. Cl.² ............................................. H04N 9/47
[52] U.S. Cl. .................................................... 358/18
[58] Field of Search ........................ 358/17, 19, 24, 18

[56] References Cited
U.S. PATENT DOCUMENTS 3,824,412  7/1974  Kroner .................................. 358/18

Primary Examiner—Robert L. Richardson
Attorney, Agent, or Firm—Eugene M. Whitacre; William H. Meagher; Ronald H. Kurdyla

[57] ABSTRACT

In a PAL color television signal receiver including a color demodulator, a source of first timing signals for determining the line by line switching of the color demodulator, and a source of second timing signals coincident with the burst interval of the color signal, a circuit for identifying an incorrect mode of line by line color demodulator switching. A signal representative of the periodic, alternating phase burst component of the color signal is sampled every other image line to derive an identification signal representative of the timing of the burst component. The identification signal is utilized to alter the operation of the source of timing signals to produce timing signals corresponding to a correct switching mode. A sampling circuit employed to derive the identification signal is keyed in response to the first and second timing signals such that the derived signal is suitable for use as a switching mode identification signal, as well as for purposes providing automatic color control (ACC) and color killer control.

10 Claims, 5 Drawing Figures

PAL IDENTIFICATION CIRCUIT

This invention relates to a control circuit in the decoder of PAL (Phase Alteration at Line Rate) or SECAM type color television equipment for identifying and correcting an incorrect mode of line to line switching.

In the PAL color television system, the R-Y subcarrier component is switched in phase by 180° from line to line at the broadcast encoder. In order to recover this R-Y component, corresponding line to line switching must occur at the decoder (e.g., in a receiver). It is conventional in a PAL color television receiver to switch the reference carrier signal input to the R-Y demodulator on a line to line basis, the reference carrier switch being driven by a suitably triggered bistable (flip-flop) circuit. Information necessary to identify the appropriate line by line switching is contained in the color burst component of the composite color signal, the phase of which is alternated in predetermined equal amounts (e.g., ±90°) leading and lagging a reference phase on a line by line basis. Additional details of the switching identification operation are set forth in U.S. Pat. No. 3,553,357 of Peter S. Carnt.

The predetermined phase relationship between the color burst component and locally generated timing signals, typically employed in a PAL decoder in conjunction with a PAL switch for switching the reference signal input to the R-Y demodulator to provide proper R-Y demodulation, can be undesirably upset for a variety of reasons. In the case of a color television receiver, for example, this phase relationship can be upset by switching from channel to channel. Noise signals can also upset the timing of the locally generated timing signals. In the case of a video signal recording medium such as disc or magnetic tape, discontinuities occurring in recorded materials or resulting during playback can produce effects similar to those produced when changing channels in a television receiver, thereby altering the phase relationship noted above. When an incorrect switching mode exists as a consequence one or more of these factors, among others, it is necessary to identify and correct the incorrect switching mode for proper demodulation of the R-Y component.

The information necessary to identify the line by line switching mode can be obtained from the burst component in various ways. A noteworthy technique for deriving a signal representative of the condition of the burst component employs sample and hold circuitry as described in U.S. Pat. No. 3,740,456 entitled "Electronic Signal Processing Circuit" of L. A. Harwood, assigned to the present assignee. This patent discloses a system employing a sampling detector with predictable, high gain characteristics. The detector includes a wide bandwidth synchronous detector and a periodically keyed sample and hold network for deriving a signal representative of the condition of the periodic burst component. This system advantageously provides predictable sampling and storage between sampling intervals by switching between a predictable "sampling" impedance and a relatively high "holding" impedance. Moreover, the transition between the sample and hold modes of operation is relatively rapid to avoid loss of information during the transition.

The sample and hold system noted above can be employed in a color television receiver to provide a control signal for utilization by automatic color control (ACC) and so-called color killer circuits, as mentioned in U.S. Pat. No. 3,740,456. It is desirable for a system of this type to also be capable of identifying the line to line switching mode from the condition of the burst component. Circuit economy then results, since additional circuits are not required for this purpose, and a single circuit, preferably of the type described in U.S. Pat. No. 3,740,456, conveniently provides a signal which can be utilized for ACC and color killer control as well as for switching mode identification.

Switching control apparatus in accordance with the present invention is included in a system for processing a color television signal including chrominance and burst components exhibiting a prescribed mutual timing relationship and alternating in phase on a line by line basis. The system also includes a chrominance channel for processing the chrominance component, and a plurality of demodulators for demodulating selected phases of the chrominance component, one demodulator being switched on a line by line basis. Proper operation of the system requires that the switched demodulator be switched in correct timing synchronism with line by line alternation of signals received by the system. The switching control apparatus comprises timing means for providing half line frequency timing signals to establish the line by line switching of the switched demodulator, and a source of keying signals coincident with the burst component. A sampling circuit is responsive to the timing and keying signals for periodically sampling signals processed by the chrominance channel during alternate line intervals, to thereby derive an identification signal representative of the phasing condition of the burst component. The identification signal is utilized to control the operation of the timing means such that timing signals corresponding to correct line to line switching are provided.

In the drawing:

FIGS. 1a–1c depict signal waveforms helpful in understanding the present invention.

Figure 1:
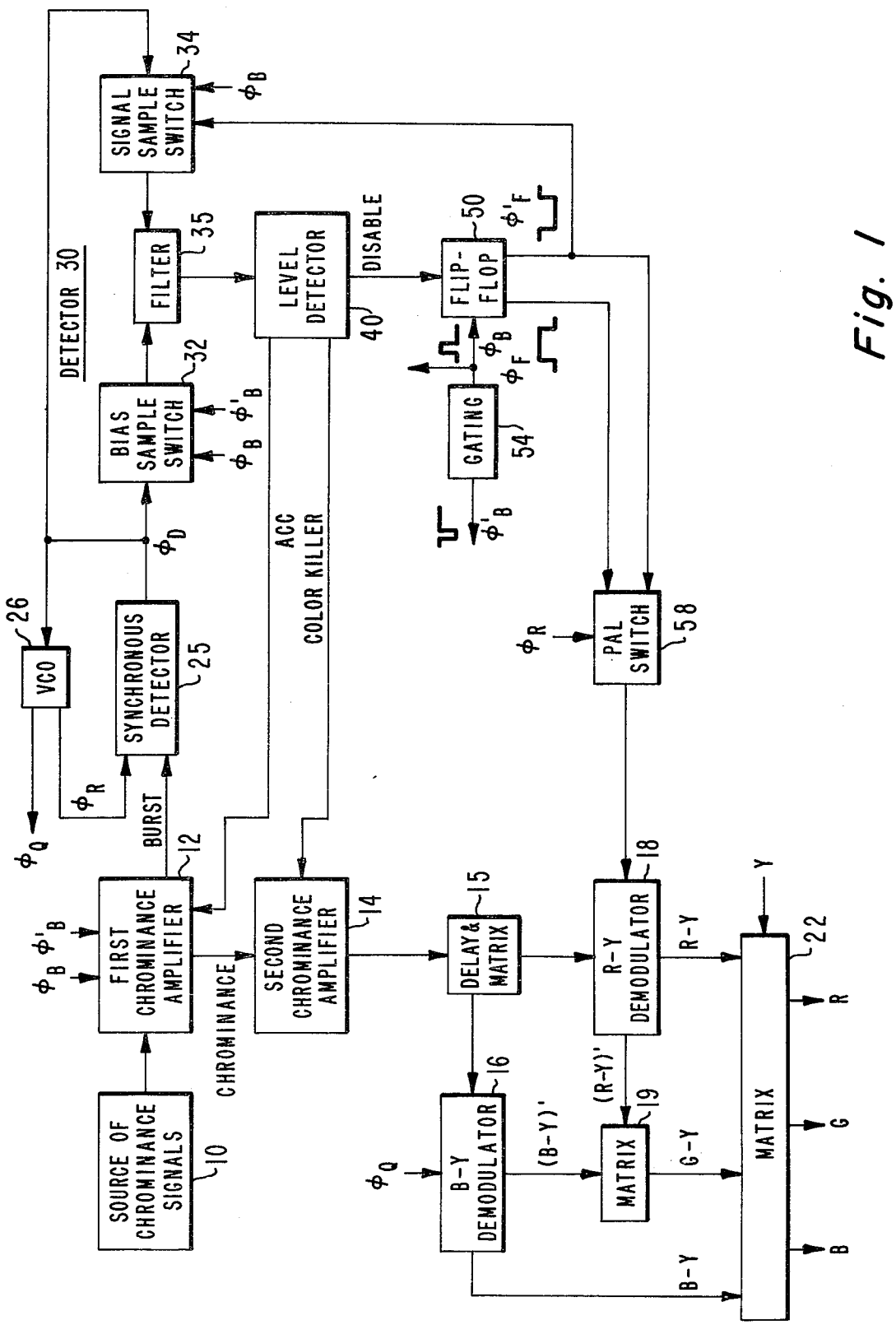
FIG. 1 illustrates a general arrangement in block diagram form of a portion of a chrominance signal processing channel in a color television receiver arranged in accordance with PAL signal processing standards and suitable for utilizing the present invention.

In FIG. 1, a signal source 10 supplies a color image signal including a periodic color synchronizing burst component and a chrominance component imposed as amplitude modulation at selected phases of a suppressed color subcarrier of approximately 4.43 MHz (in accordance with one PAL system standard) to an input of a gated first chrominance amplifier 12. The burst component typically comprises approximately ten cycles of unmodulated color subcarrier transmitted during the synchronizing interval following the end of each line of image information of the transmitted television signal. The color burst information is present only for a relatively short time interval of approximately 2.5 microseconds of each horizontal image scanning line of about sixty-four microseconds duration. Amplifier 12 provides separated chrominance and burst components in response to locally generated, complementary phase burst gate signals $\phi_B$ (FIG. 1b) and $\phi_B'$ of duration $T_B$.

The separated chrominance component from amplifier 12 is amplified by a second, gain controlled chrominance amplifier 14. The amplified chrominance component from amplifier 14 is delayed approximately one horizontal scanning line by a PAL delay line included in a delay and matrix unit 15. Output signals from unit 15 are supplied to synchronous signal demodulators 16 and 18 which provide demodulated B-Y and R-Y color difference signals. Demodulators 16 and 18 also respectively provide versions of the demodulation color difference signals, (B-Y)' and (R-Y)', which are combined in a matrix 19 to produce a color difference signal G-Y. As is known, the R-Y, B-Y and G-Y color difference signals are combined in a matrix 22 with a luminance signal Y from a luminance channel of the receiver to provide R, B and G color signals, which are then suitably applied to a color image reproducing kinescope (not shown).

The separated burst component from amplifier 12 and a reference subcarrier signal $\phi_R$ from a voltage controlled oscillator (VCO) 26 are supplied as inputs to a wideband synchronous detector 25. Detector 25 produces an output signal $\phi_D$ representative of the phase and/or frequency difference between signal $\phi_R$ from VCO 26 and the burst component from amplifier 12. Detected signal $\phi_D$ in turn is supplied as a synchronizing signal input to VCO 26 through an appropriate filter network (not shown) for providing a signal representative of the average level of signal $\phi_D$. Oscillator 26 also provides a subcarrier reference signal $\phi_Q$ in guadrature phase relation with signal $\phi_R$. Oscillator signal $\phi_Q$ is applied to demodulator 16 for demodulating the B-Y signal phase, and signal $\phi_R$ is applied to demodulator 18 via a PAL switch 58 for demodulating the R-Y signal.

Detected burst representative signal $\phi_D$ (FIG. 1a) comprises periodic pulses of alternating positive and negative going direction (i.e., complementary phase) from one horizontal image scanning line (1 H) to the next. The duration of these pulses typically is less than the burst gate interval $T_B$. The positive and negative pulses of signal $\phi_D$ respectively recur at a 7.8 KHz rate, or one-half the line scanning rate of 15.6 KHz. In this instance a synchronized oscillator condition is assumed, whereby the pulses comprising signal $\phi_D$ exhibit uniform magnitude.

Signal $\phi_D$ also is coupled to a detector 30 including a gated bias sample and hold switch 32, a gated signal sample and hold switch 34 and a filter 35 as generally described in U.S. Pat. No. 3,740,456. A level detector 40 responds to a control signal generated by filter 35 for providing an ACC signal to control the gain of first amplifier 12, and a color killer control signal which normally serves to disable second chrominance amplifier 14 under weak color signal or monochrome signal conditions, as well as wrong identification conditions.

Level detector 40 also provides a DISABLE signal for altering the operation of a flip-flop 50 (e.g., a bistable multivibrator) under circumstances to be discussed, such that a correct output signal phase is produced. Flip-flop 50 is normally triggered in response to the leading edge of burst gate signal $\phi_B$ from a gating unit 54, which provides complementary phase burst gating signals $\phi_B$ (FIG. 1b) and $\phi_B'$ at the line scanning rate. Complementary phase output signals $\phi_F'$ (FIG. 1c) and $\phi_F$ from flip-flop 50 serve as synchronizing timing signals for PAL switch 58 so that demodulator 18 receives an appropriate phase of subcarrier reference signals $\phi_R$ for properly demodulating the R-Y component. Signals $\phi_F$ and $\phi_F'$ recur at one-half the line scanning rate and are normally in correct synchronism with the burst component. The $\phi_F'$ output signal from flip-flop 50 together with burst gate signal $\phi_B$ control the operation of signal sampling switch 34, as will be discussed.

Figure 2:
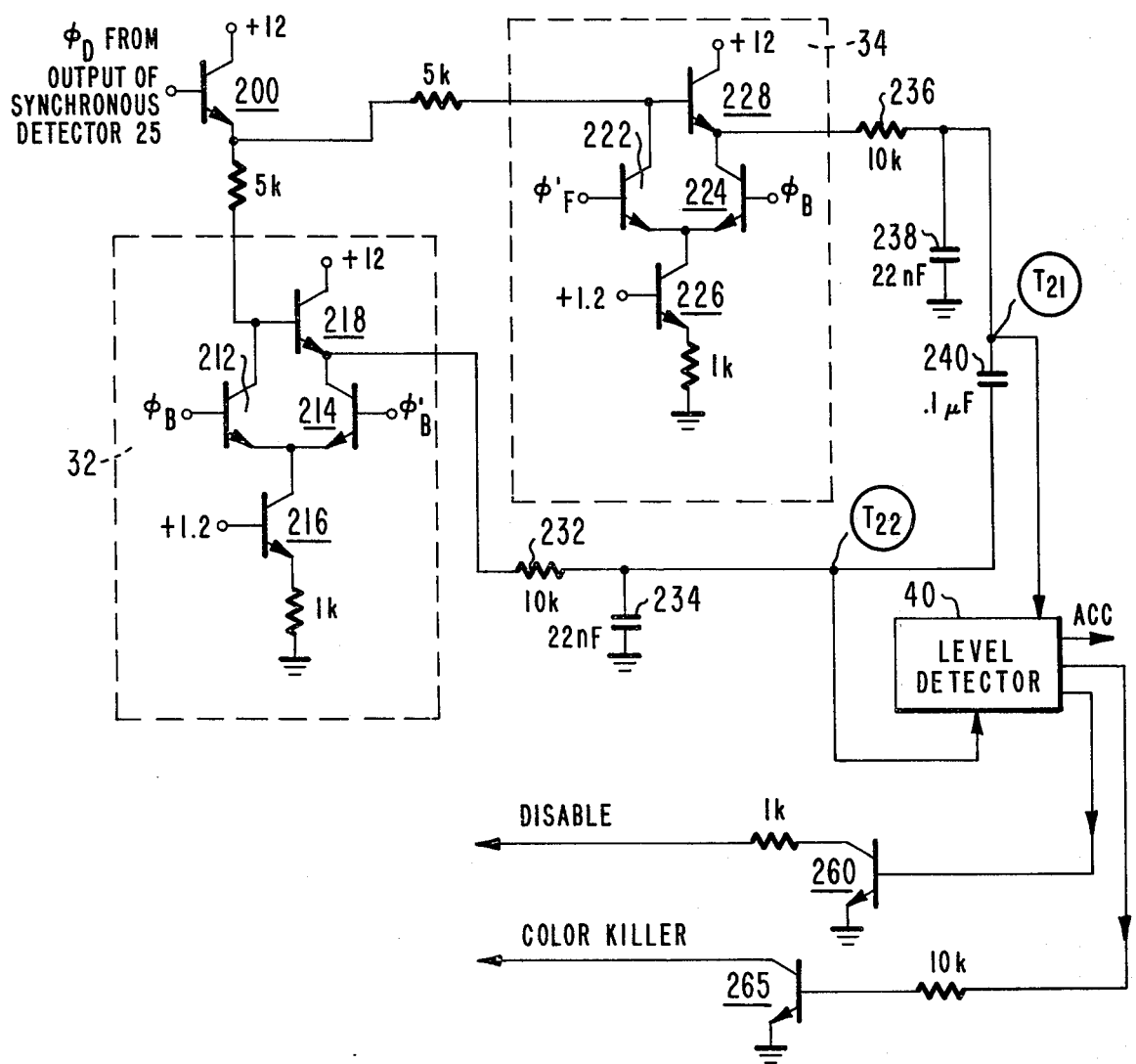
FIG. 2 shows a schematic circuit diagram of a portion of the arrangement shown in FIG. 1 in accordance with the present invention.

Reference is now made to the circuit of FIG. 2 together with FIG. 1. In accordance with the present invention, a signal corresponding to the timing condition of the burst component is derived by sampling a signal ($\phi_D$) representative of the condition of the alternating burst component every other horizontal image line. A sample and hold circuit illustratively comprising sampling switch 34 and an associated filter circuit 236, 238 in FIG. 2 is employed for this purpose. The circuit is keyed by signals $\phi_F'$ and $\phi_B$ such that the derived signal is suitable for use as a switching mode identification signal, as well as for purposes of providing ACC and color killer control.

In FIG. 2, detected burst representative signal $\phi_D$ from the output of detector 25 is direct coupled at low impedance via an isolation follower transistor 200 to signal sampling switch circuit 34 and bias sampling switch circuit 32. Switch 34 forms a signal sample and hold network with a filter circuit including a resistor 236 and a storage capacitor 238, and switch 32 forms a bias sample and hold network with a filter circuit including a resistor 232 and a storage capacitor 234.

Signal sampling circuit 34 comprises differentially arranged switching transistors 222 and 224, a current source transistor 226, and a keyed follower transistor 228, all arranged as shown. A low impedance emitter output of transistor 228 is coupled to a first terminal $T_{21}$ by means of a network including resistor 236 and capacitor 238. Bias sampling circuit 32 is similar to circuit 34 and includes differentially connected switching transistors 212 and 214, a current source transistor 216, and a keyed follower transistor 218, all arranged as shown. An emitter output of follower transistor 218 is coupled to a second terminal $T_{22}$ by means of a network including resistor 232 and capacitor 234. A voltage smoothing filter capacitor 240 coupled between terminals $T_{21}$ and $T_{22}$ forms a time constant network together with resistor 236 and capacitor 238.

The general operation of sampling switches 32 and 34 is described in detail in U.S. Pat. No. 3,740,456 mentioned previously. Specifically, bias and signal sampling circuits 32 and 34 operate in a complementary manner between low and high impedance states (i.e., while one is sampling the output of detector 25, the other is off and vice-versa) for alternately coupling and decoupling the output of detector 25 to and from the associated filter circuits. Bias switch 32 samples the quiescent D.C. voltage level of the output from detector 25 during the interval of signal $\phi_D$ which is devoid of the burst representative pulses ($T_C$ in FIG. 1a), at which time switching circuit 34 is inoperative. A positive direct voltage representative of this level is developed on and stored by capacitor 234. For purposes of simplicity it is assumed that this direct voltage remains substantially constant.

Normally positive or negative voltages each representative of the magnitude of a corresponding sampled pulse of signal $\phi_D$ are developed on and stored by capacitor 238, and appear at terminal $T_{21}$, as follows. When signal $\phi_F'$ at the base of transistor 222 is relatively negative (i.e., sufficient to render transistor 222 non-conductive) and signal $\phi_B$ at the base of transistor 224 is relatively positive (i.e., sufficient to render transistor 224 conductive), follower 228 is keyed on and the pulse of signal $\phi_D$ then present at the base of transistor 228 is transmitted via the base-emitter junction of transistor 228 to develop a corresponding voltage on capacitor 238. A relatively positive or negative voltage corresponding to the magnitude of the transmitted pulse then appears at terminal $T_{21}$.

When signal $\phi_F'$ is relatively positive, transistor 222 is rendered conductive. Collector current of transistor 222 depletes the base current drive of transistor 228, causing transistor 228 to turn off and thereby preventing the pulses of signal $\phi_D$ from being transmitted to capacitor 238 and terminal $T_{21}$. In this instance capacitor 238 retains the charge deposited during the last preceding sampling interval, reduced by leakage currents (e.g., the very small base current of the input transistor of level detector 40). Observations analogous to the above apply to the switching operation of bias sampling switch 32 in response to signals $\phi_B$ and $\phi_B'$.

In this example, circuit 34 normally samples the positive-going pulses from detector 25 during each interval $T_B$ under correct timing conditions. Each positive pulse is sampled (i.e., only every other pulse of signal $\phi_D$ is normally sampled) when positive burst gate pulses $\phi_B$ occur during the "negative" interval of signal $\phi_F'$ ($T_O$ in FIG. 1c). This relative timing of signals $\phi_F'$ and $\phi_B$ whereby positive pulses are sampled corresponds to a normal or correct timing condition in this instance.

The normally positive potentials developed on terminals $T_{21}$ and $T_{22}$ are D.C. translated and compared by a non-inverting level detector 40. The voltage developed on terminal $T_{21}$ becomes less positive under weak received color signal conditions, since detected burst representative signal $\phi_D$ will then exhibit a corresponding reduced amplitude. In response to this condition, level detector 40 produces a compensating ACC output voltage for increasing the gain of first chrominance amplifier 12. Increasingly weaker received signals cause level detector 40 to produce a color killer output voltage sufficient to render a color killer transistor 265 conductive. An additional output voltage, delayed relative to the color killer output voltage also is produced for rendering a control transistor 260 subsequently conductive. When conducting, transistors 265 and 260 respectively provide collector output control signals for disabling second chrominance amplifier 14 and flip-flop 50.

An incorrect PAL switching condition is considered to exist when the timing relationship between burst gate pulse $\phi_B$ and interval $T_O$ of flip-flop timing signal $\phi_F'$ is such that sampling switch 34 is caused to sample the negative pulses of signal $\phi_D$. This incorrect signal condition essentially corresponds to an incorrect phase relationship of the burst component and the flip-flop switching signal, and can result for a variety of reasons, some of which have been mentioned earlier.

The incorrect timing condition causes the filtered voltage appearing at terminal $T_{21}$ to exhibit a negative-going (less positive) magnitude, since circuit 34 then samples the negative-going pulses rather than the positive pulses of signal $\phi_D$. Capacitor 238 then charges in response to the magnitude of the negative-going pulses, causing a negative-going direct voltage (relative to the bias representative voltage on terminal $T_{22}$) to appear at terminal $T_{21}$. This voltage is hereinafter referred to as the identification voltage.

The identification voltage as translated by level detector 40 causes transistor 260 to saturate, thereby producing a negative-going DISABLE signal at a collector output for disabling flip-flop 50. Flip-flop 50 is arranged such that during this time the $\phi_F'$ signal output exhibits a less positive magnitude sufficient to render transistor 222 of circuit 34 nonconductive. Circuit 34 consequently samples both positive and negative pulses of signal $\phi_D$ (i.e., every pulse). Capacitor 238 then begins to charge in a positive direction, toward the average level of signal $\phi_D$. When the voltage on capacitor 238 reaches a level at which transistor 222 is caused to come out of saturation in response to this level as translated by level detector 40, the DISABLE voltage is removed and flip-flop 50 is again enabled. At this time there exists a fifty percent likelihood that flip-flop 50 will operate in the correct switching mode. If the switching mode is again incorrect, the negative identification voltage is developed, flip-flop 50 is again disabled, and the sequence outlined above is repeated. If the switching mode is correct, a positive voltage is developed at terminal $T_{21}$ and the operation of flip-flop 50 is left undisturbed.

In the circuit of FIG. 2, a relatively long resistance-capacitance signal identification time constant (i.e., response time) is determined primarily by the values of capacitor 240 and resistors 232, 236. However, the filter networks coupled to terminals $T_{21}$ and $T_{22}$ can be modified to exhibit a faster response time to identification pulses of signal $\phi_D$ from detector 25, whereby an incorrect timing mode is identified and correct timing is restored rapidly. This result is described in a copending U.S. patent application Ser. No. 836,712 entitled "PAL Switching Control Circuit" of L. A. Harwood et al., filed concurrently with this application and assigned to the present assignee.

It is also noted that color killer operation in response to an incorrect timing condition can cause disconcerting visible effects as perceived from a displayed image. These can be substantially eliminated when, as in this example, the level at terminal $T_{21}$ at which color killer action is inhibited exceeds the average level of signal $\phi_D$, and the color killer exhibits a relatively long time constant (e.g., of approximately 500 milliseconds). The color killer time constant can be derived from a viewer adjustable color control circuit of the receiver, as discussed in the copending patent application mentioned above.

A sample and hold arrangement of the type described in U.S. Pat. No. 3,740,456 is advantageously employed for switch 34. Such an arrangement exhibits predictable, rapid operation for providing a signal at terminal $T_{21}$ suitable for use as a switching mode identification signal, as well as for purposes of ACC and color killer control, from the relatively short duration burst representative pulses of signal $\phi_D$. In addition, suitable compensation for circuit tolerances is achieved by establishing the relative amplitudes of switching signals $\phi_B$ and $\phi_F'$ as illustrated in FIGS. 1b and 1c, and suitable noise immunity can be provided by appropriately selecting the values of capacitor 240 and low pass filter 232, 234 networks 236, 238. The free-running operation of flip-flop 50 once the correct switching mode is established also assists to provide noise immune operation.

While the invention has been described in terms of a preferred embodiment, it should be recognized that various modifications can be made by persons skilled in the art without departing from the scope of the invention. Component values and other examples of operating parameters have been mentioned as an aid to understanding the invention and are not intended to be limiting.

The switching mode identification apparatus of the invention is useful not only in PAL television receivers, but also in other PAL equipment where switching mode identification and control is required (e.g., tape recorders, cameras and picture monitors). The control concept of the invention may also be advantageously employed in conjunction with decoders in the SECAM type of color television system.

Amplifier 12, amplifier 14, synchronous detector 25 and oscillator 26 can comprise circuits of the type disclosed in U.S. Pat. Nos. 4,038,681; 3,740,465; 3,740,456 and 4,020,500, respectively, all of L. A. Harwood and assigned to the present assignee. Circuits for level detector 40, flip-flop 50 and PAL switch 58 can be of the type shown in the aforementioned copending U.S. patent application of L. A. Harwood et al.

What is claimed is:

1. In a receiver for processing a color television signal including chrominance and burst components exhibiting a prescribed mutual timing relationship and alternating in phase on a line by line basis, a chrominance channel for processing said color signal, a plurality of color demodulators for demodulating selected phases of said chrominance component, means for providing line by line switching control of one of said demodulators, and wherein proper operation of said receiver requires that said demodulator be switched in correct timing synchronism with line by line alternation of signals received by said receiver, switching control apparatus comprising:
   timing means for providing half line frequency timing signals, said timing means being coupled to said switching control means for determining said line by line switching;
   means for providing keying signals coincident with said burst component;
   sampling means responsive to said timing and keying signals for periodically sampling signals processed by said chrominance channel during alternate line intervals, for deriving an identification signal representative of the timing condition of said burst component; and
   means for coupling said identification signal to said timing means for controlling the operation of said timing means such that timing signals corresponding to correct line to line switching are provided.

2. Apparatus according to claim 1, wherein:
   said chrominance channel includes detector means responsive to said burst component for providing a signal representative of said burst component; and
   said sampling means is coupled to said detector means for deriving said identification signal from said burst representative signal.

3. Apparatus according to claim 2, wherein:
   said timing means comprises a bistable circuit being disabled in response to said identification signal when present.

4. Apparatus according to claim 2, wherein:
   said timing and keying signals exhibit a mutual timing relationship such that said identification signal is produced when said sampling means samples a predetermined characteristic of said burst representative signal.

5. Apparatus according to claim 4, wherein:
   said sampled characteristic corresponds to the magnitude of said burst representative signal.

6. Apparatus according to claim 4, wherein:
   said sampling means includes charge storage filter means; and
   said sampling means is rendered operable between relatively low and high impedance states for alternately coupling said burst representative signal to said filter means and for uncoupling said last named signal from said filter means so as to store information representative of said characteristic at said filter means.

7. Apparatus according to claim 6, wherein:
   said filter means exhibits a time constant determinative of the response time of said sampling means.

8. Apparatus according to claim 7, wherein said sampling means comprises:
   controllable conduction means defining a signal path for said burst representative signal to said filter means; and
   switching means coupled to said controllable conduction means and responsive to said timing and keying signals, for rendering said controllable conduction means conductive during each sampling interval for coupling said burst representative signal to said filter means, and substantially non-conductive during each non-sampling interval of each operating cycle.

9. Apparatus according to claim 1, wherein said receiver further comprises:
   means coupled to said chrominance channel for automatically controlling the magnitude of signals processed by said chrominance channel in response to received signals of varying intensity, said controlling means being responsive to output signals from said sampling means.

10. Apparatus according to claim 9, wherein said controlling means comprises:
   first means for varying the signal gain of said chrominance channel inversely relative to the level of said received color signals; and
   second means for inhibiting said chrominance channel in the presence of received color signals of a magnitude below a given level.

* * * * *